United States Patent [19]

Powers

[11] Patent Number: 5,619,346
[45] Date of Patent: Apr. 8, 1997

[54] METHOD AND SYSTEM FOR CONVERTING A HALF RATE/FULL RATE MONOCHROME SCANNER TO A HALF RATE/FULL RATE COLOR SCANNER

[75] Inventor: John G. Powers, Ontario, N.Y.

[73] Assignee: Xerox Corporation, Stamford, Conn.

[21] Appl. No.: 519,887

[22] Filed: Aug. 28, 1995

[51] Int. Cl.⁶ ....................... H04N 1/48
[52] U.S. Cl. ............ 358/505; 358/512; 359/856; 359/61; 359/876; 359/884
[58] Field of Search ............. 358/505, 512; 359/855, 856, 857, 861, 876, 884, 850, 872

[56] References Cited

U.S. PATENT DOCUMENTS

| | | | |
|---|---|---|---|
| 4,401,384 | 8/1983 | Abe | 355/856 |
| 4,560,236 | 12/1985 | Clarke | 359/884 |
| 5,315,414 | 5/1994 | Beikirch et al. | 358/512 |

*Primary Examiner*—Scott A. Rogers
*Attorney, Agent, or Firm*—Michael J. Nickerson

[57] ABSTRACT

A full color digital scanning system includes a lamp carriage having a light source and a mirror. A mirror carriage is also included with a rotatable corner mirror assembly. The rotatable corner mirror assembly has a first color corner mirror subassembly, a second color corner mirror subassembly, and a third color corner mirror subassembly. The scanning system positions a first color corner mirror on a mirror carriage to provide a 180° cornering function and scans the image to produce image data representing a first color component. The scanning system then positions a second color corner mirror on the mirror carriage to provide a 180° cornering function and scans the image to produce image data representing a second color component. The scanning system further positions a third color corner mirror on the mirror carriage to provide a 180° cornering function and scans the image to produce image data representing a third color component.

7 Claims, 2 Drawing Sheets

METHOD AND SYSTEM FOR CONVERTING A HALF RATE/FULL RATE MONOCHROME SCANNER TO A HALF RATE/FULL RATE COLOR SCANNER

FIELD OF THE PRESENT INVENTION

The present invention relates generally to providing a color filter system to be placed in a conventional monochrome scanner to convert the monochrome scanner into a full color scanner. More specifically, the present invention is directed to a paddle wheel of mirrors and color filters which replace a corner mirror subassembly of a conventional monochrome scanner to convert the monochrome scanner into a full color scanner.

BACKGROUND OF THE PRESENT INVENTION

Conventionally, low volume and mid-volume copiers and image input terminals utilize moving scanning carriages to scan an image. These moving scanning carriages usually include an illumination device like a fluorescent lamp. These scanning carriages are moved across an image by a cable system during the scanning process. Such a prior art scanning carriage system is illustrated in FIG. 1. This scanning system is commonly called a half rate/full rate scanning system.

In FIG. 1, a motor 1 in conjunction with a belt 3 is used to drive a capstan 5. Capstan 5 has a plurality of cable windings around it such that when the capstan 5 is rotated, certain cable strands are pulled onto the capstan and other cable strands are released from the capstan. As illustrated in FIG. 1, two sets of cables 11 and 13 are used to move a lamp carriage 17 and a mirror carriage 19 having corner mirrors 21 positioned thereon.

Cable 11 is connected to the frame 9 by anchor 10. The cable 11 is then wrapped around pulley (roller) 57 and connected to the lamp carriage 17 through clamp 28. From clamp 28, cable 11 is wrapped around pulleys (rollers) 51 and 50 before being wrapped around, capstan 5. The remaining portion of cable 11 wraps around pulleys (rollers) 55, 60, 58, and 59 before being connected to spring 8. Spring 8 is connected to the frame 9 by anchor 6. Cable 11 is connected to the mirror carriage 19 at pulleys (rollers) 57 and 58.

Cable 13 is connected to the frame 9 by anchor 2. The cable 13 is then wrapped around pulley (roller) 52 and connected to the lamp carriage 17 through clamp 27. From clamp 27, cable 13 is wrapped around pulley (roller) 50 before being wrapped around capstan 5. The remaining portion of cable 13 wraps around pulleys (rollers) 54, 53, and 56 before being connected to spring 4. Spring 4 is connected to the frame 9 by anchor 6. Cable 13 is connected to the mirror carriage 19 at pulleys (rollers) 52 and 53.

The cables 11 and 13 are wrapped around the pulleys (rollers) in such a configuration that when the cables 11 and 13 are released or pulled onto the capstan 5, the carriages 17 and 19 are properly moved to scan the image. More specifically, a lamp 15 which is located on the lamp carriage 17 provides a light source to scan the image wherein the light reflected from the image is incident upon mirrors located on the lamp carriage 19 and thus are directed toward corner mirrors 21 located on the mirror carriage 19. The corner mirrors 21 direct the reflected light from the mirror on the lamp carriage 19 to a lens. The lens focuses the scanned image onto a CCD or full width array sensor. The sensor converts the reflected light into electrical signals representing the scanned image.

This scanning operation can be more clearly seen in FIG. 2 of the present application. FIG. 2 illustrates the path of light as it is reflected from the image 101. The reflected light, as noted above, is incident upon a mirror 117 which is located on the lamp carriage 17. This mirror 117 then directs the light towards the corner mirrors 21 on the mirror carriage which causes the light to make a 180° turn. The light leaving the corner mirrors 21 is directed to an optical lens assembly 107 which focuses the reflected light upon a CCD or full width sensor array 109.

The utilization of pulleys on the mirror carriage 19 allows the mirror carriage to move into proper proportion to the movement of the lamp carriage 17. In other words, a focused image is maintained by maintaining a certain fixed optical distance between the image 101 and the lens 107 while the lamp carriage 17 is moving. The fixed optical length is ensured by the mirror carriage 19 moving at exactly one half the speed of the lamp carriage 17 and in the same direction as the lamp carriage 17.

It is desirable to produce full color images with digital scanners. To produce a full color image, the light reflected from the image must be filtered by at least three color filters so as to produce three sets of color image data. Although digital scanners have been able to achieve this result, the result has only been achieved by redesigning the entire scanning system which increases the cost of producing a color scanner. The mirror system described above does not aid in the color separation process. Thus, it is desirable to provide a retrofit to a monochrome digital scanner's scanning system which easily converts the monochrome scanner to a full color digital scanner.

SUMMARY OF THE PRESENT INVENTION

One aspect of the present invention is a full color digital scanning system. The system includes a lamp carriage having a light source and a mirror and a mirror carriage including a rotatable corner mirror assembly. The rotatable corner mirror assembly includes a first color corner mirror subassembly, a second color corner mirror subassembly, and a third color corner mirror subassembly.

Another aspect of the present invention is a mirror carriage for a half rate/full rate digital scanner. The digital scanner includes a mirror carriage having a rotatable corner mirror assembly. The rotatable corner mirror assembly includes a first color corner mirror subassembly, a second color corner mirror subassembly, and a third color corner mirror subassembly.

A third aspect of the present invention is a method for providing a full color scan of an image with a half rate/full rate digital scanner. The method positions a first color corner mirror on a mirror carriage to provide a 180° cornering function; scans the image to produce image data representing a first color component; positions a second color corner mirror on the mirror carriage to provide a 180° cornering function; scans the image to produce image data representing a second color component; positions a third color corner mirror on the mirror carriage to provide a 180° cornering function; and scans the image to produce image data representing a third color component.

Further objects and advantages of the present invention will become apparent from the following description of the various features of the present invention:

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
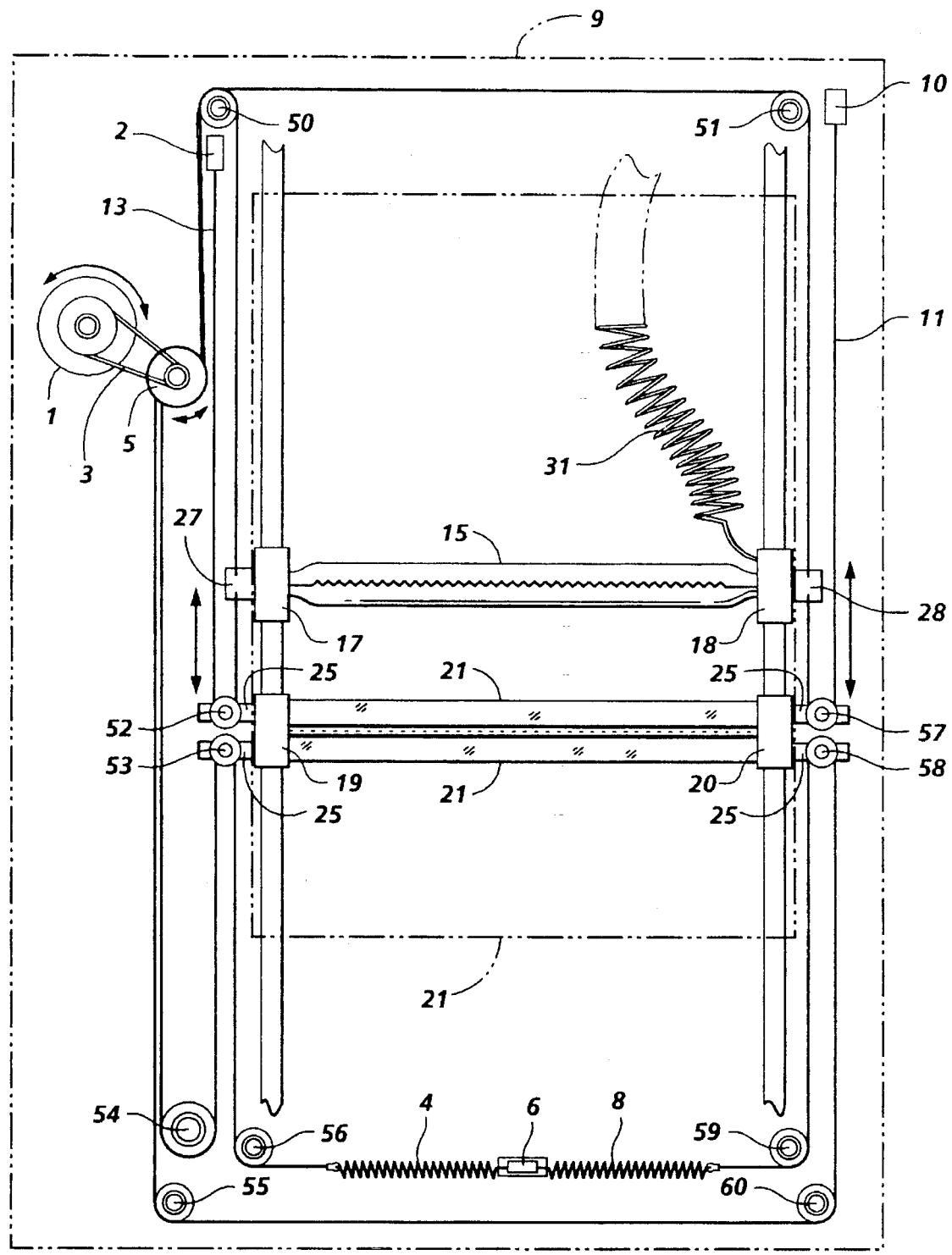
FIG. 1 is a plan view of a prior art scanning carriage system.
Figure 2:
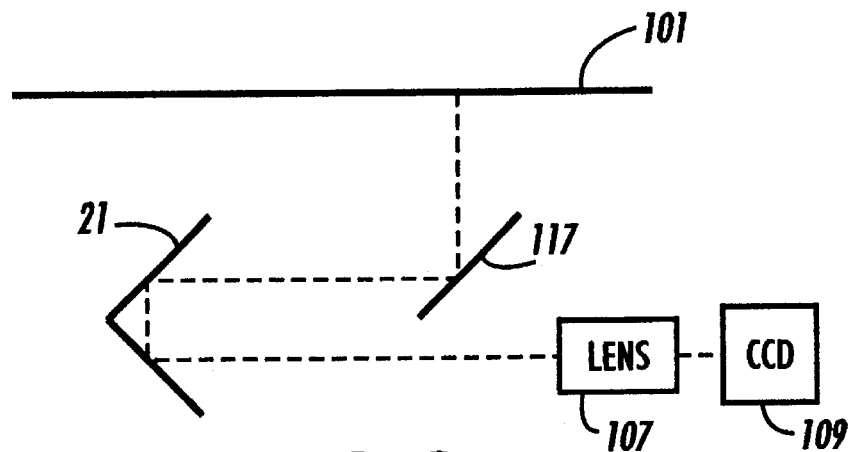
FIG. 2 is a plan view of a prior art scanning carriage system showing the optical path of the reflected image.

For a general understanding of the present invention, reference is made to the drawings. In the drawings, like reference numerals have been used throughout to designate identical or equivalent elements.

Figure 3:
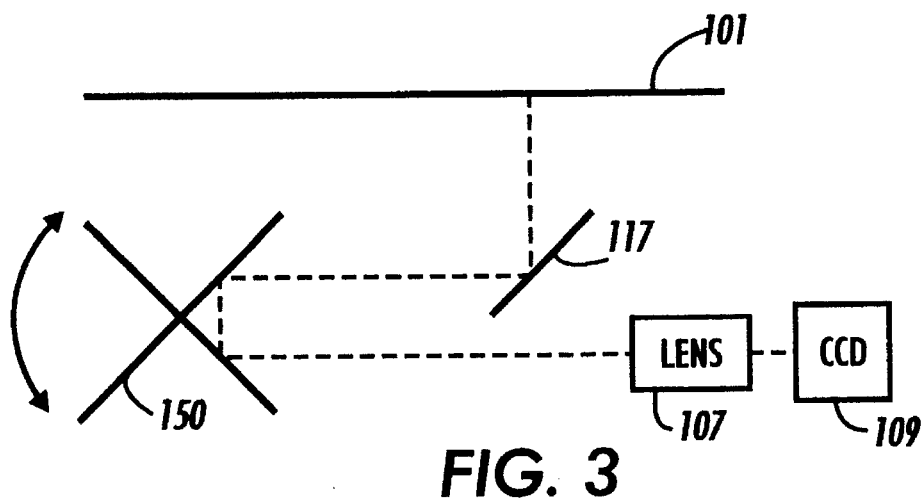
FIG. 3 is a block diagram of a scanning system utilizing the present invention.

FIG. 3 illustrates a half rate/full rate scanning system utilizing the concepts of the present invention. In FIG. 3, light reflected from an image 101 is incident upon a mirror 117 which is located on a lamp carriage as illustrated in FIG. 1. The mirror 117 directs the light reflected from the image 101 to a mirror carriage which consists of a paddle wheel-type corner mirror 150.

Figure 4:
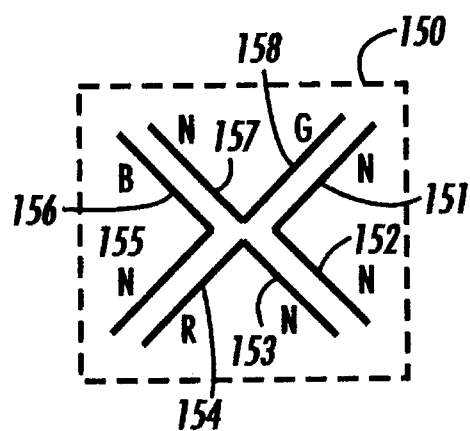
FIG. 4 is an illustration showing the filter configuration of the corner mirror subassemblies of the scanning system utilized in the present invention.

The paddle wheel-type corner mirror 150 redirects the light reflected from the image 101 180° towards an optical lens subassembly 107 which focuses the light onto a CCD or full width array sensor 109. The paddle wheel-type corner mirror 150, as illustrated in FIG. 4, has 8 sides wherein three or more sides are overlaid with a predetermined filter. It is further noted that 2 sides of the 8-sided paddle wheel act together to perform the corner function of the corner mirror.

For example, as illustrated in FIG. 4, sides 151 and 152 function together such that the light from the image 101 impinges upon side 151 is then directed down to side 152 which then directs the light reflected from the image 101 to the optical lens subassembly 107. Moreover, sides 153 and 154, 155 and 156, and 157 and 158 likewise function together to provide the same cornering function. In this way, the two opposing sides are able to redirect the light reflected from the image 101 180° so that the reflected light passes through the optical lens subassembly 107 prior to being received by the CCD sensor or full width array 109.

As noted above, FIG. 4 illustrates a detailed construction of the paddle wheel-type corner mirror utilized in the present invention. More specifically, the paddle wheel-type corner mirror 150 includes 8 sides (151, 152, 153, 154, 155, 156, 157, and 158) wherein three or more mirrors are coated with a particular filter. For example, mirrors 151 and 152 are not coated or are coated with a neutral color filter or are coated with a color filter that when scanned will represent neutral such that when the mirrors 151 and 152 are utilized to provide the corner mirror function, the digital scanner of the present invention operates in a monochrome fashion.

On the other hand, mirrors 153 and 154 are coated with one or two filters which acting together produce a red filter. Thus, when the paddle wheel-type corner mirror is rotated such that mirrors 153 and 154 provide the corner mirror function, the light impinging upon the CCD sensor or full width array 109 represents the red color component of the image 101.

Moreover, when the paddle wheel-type corner mirror is rotated another 90 degrees, mirrors 155 and 156 provide the corner mirror function. As illustrated in FIG. 4, mirrors 155 and 156 are coated with one or two filters which acting together produce a blue filter. Thus, when the mirrors 155 and 156 provide the corner mirror function, the light reflected from the image 101 upon the CCD sensor or full width array 109 represents the blue color component of the image 101.

Lastly, when the paddle wheel-type cornering mirror is rotated another 90 degrees, the mirrors 157 and 158 provide the corner mirror function. As illustrated in FIG. 4, mirrors 157 and 158 are coated with one or two filters which acting together produce a green filter. Thus, when the mirrors 157 and 158 provide the corner mirror function, the light reflected from the image 101 upon the CCD sensor or full width array 109 represents the green color component of the image 101.

It is noted that the color filters need not be limited to neutral, red, green, and blue, but may be any combination of color filters which are capable of describing a wide gamut of colors.

By utilizing the paddle wheel-type corner mirror assembly as illustrated in FIG. 4, a conventional monochrome half rate/full rate scanning system can be converted to a full color system which is capable of operating in both a monochrome mode and a color mode. More specifically, if the half rate/full rate scanning system is operating in a monochrome mode, the mirrors 151 and 152 are positioned to provide the cornering function so that the light reflected from the image 101 is directed to the CCD sensor or full width array 109. On the other hand, if the half rate/full rate scanning system is operating in a full color mode, mirrors 153 and 154, 155 and 156, and 157 and 158 are rotated through the optical path of the light reflected from the image 101 so as to provide the color components of the image 101 to the CCD or full width array sensor 109.

In the preferred embodiment of the present invention, the paddle wheel-type corner mirroring system is indexed to provide the specific color component for the full color scanning by utilizing a mechanical ratcheting mechanism that rotates the paddle wheel when the half rate/full rate carriage is overdriven into a stop.

For example, when the half rate/full rate system of the present invention is scanning in a full color mode, a single scan of the image is completed with the mirrors 153 and 154 providing the cornering function and directing the red component of the image towards the photosensors. After this scan (the red scan) of the image is completed, the paddle wheel-type corner mirror assembly is rotated 90 degrees such that during the second scan of the image, the mirrors 155 and 156 provide the cornering function such that the blue component of the image is directed to the photosensors. After the second scan (the blue scan) is completed, the paddle wheel-type cornering mirror assembly is rotated another 90 degrees so that the mirrors 157 and 158 provide the cornering function and direct the green component of the image 101 towards the photosensors.

Therefore, utilizing the paddle wheel-type cornering mirror assembly, as illustrated in FIG. 4, a half rate/full rate monochrome scanning system can be easily converted to a half rate/full rate full color scanning system.

Moreover, in lieu of utilizing a mechanical ratcheting mechanism, a motor or solenoid can be utilized to index the paddle wheel.

Lastly, although the present invention has been described with a full color system utilizing a multi-pass or multi-scan to produce the color data, the paddle wheel-type corner mirror assembly can also be utilized in a single pass system wherein the paddle wheel can be continuously rotated through the single scan of the image so as to provide only certain color components of the image being scanned.

While the invention has been described with reference to various embodiments disclosed above, it is not confined to the details set forth above, but is intended to cover such modifications or changes as may come within the scope of the attached claims.

What is claimed is:

1. A full color digital scanning system, comprising:
   a lamp carriage including a light source and a mirror; and
   a mirror carriage including a rotatable corner mirror assembly;
   said rotatable corner mirror assembly including,
     a first color corner mirror subassembly,
     a second color corner mirror subassembly, and
     a third color corner mirror subassembly.

2. The full color digital scanning system as claimed in claim 1, wherein said rotatable corner mirror assembly further includes a neutral color corner mirror subassembly.

3. The full color digital scanning system as claimed in claim 1, wherein said first color corner mirror subassembly includes two mirrors with a first color component filter positioned on one mirror, said second color corner mirror subassembly includes two mirrors with a second color component filter positioned on one mirror, and said third color corner mirror subassembly includes two mirrors with a third color component filter positioned on one mirror.

4. A mirror carriage for a half rate/full rate digital scanner, comprising:
   a mirror carriage including a rotatable corner mirror assembly;
   said rotatable corner mirror assembly including,
     a first color corner mirror subassembly,
     a second color corner mirror subassembly, and
     a third color corner mirror subassembly.

5. The full color digital scanning system as claimed in claim 4, wherein said rotatable corner mirror assembly further includes a neutral color corner mirror subassembly.

6. The full color digital scanning system as claimed in claim 4, wherein said first color corner mirror subassembly includes two mirrors with a red filter positioned on one mirror, said second color corner mirror subassembly includes two mirrors with a green filter positioned on one mirror, and said third color corner mirror subassembly includes two mirrors with a blue filter positioned on one mirror.

7. A method for providing a full color scan of an image with a half rate/full rate digital scanner, comprising the steps of:
   (a) positioning a first color corner mirror on a mirror carriage to provide a 180° cornering function;
   (b) scanning the image to produce image data representing a first color component;
   (c) positioning a second color corner mirror on the mirror carriage to provide a 180° cornering function;
   (d) scanning the image to produce image data representing a second color component;
   (e) positioning a third color corner mirror on the mirror carriage to provide a 180° cornering function; and
   (f) scanning the image to produce image data representing a third color component.

* * * * *